United States Patent
Subramaniyan et al.

(10) Patent No.: US 11,074,819 B2
(45) Date of Patent: Jul. 27, 2021

(54) METHOD AND SYSTEM FOR ENABLING COMPUTATIONS TO ESTIMATE AND PREDICT COSTS WITH A COST INDEX BY AN OPERATING COST APP WITH AN OPERATING COST INTEGRATOR INTERFACE FOR DISPLAYING GATE TO GATE FLIGHT COSTS

(71) Applicant: HONEYWELL INTERNATIONAL INC., Morris Plains, NJ (US)

(72) Inventors: Muthusankar Subramaniyan, Tamil Nadu (IN); Visvanathan Thanigai Nathan, Karnataka (IN); Raghu Shamasundar, Karnataka (IN); Vijayvenkatesh Srinivasan, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 296 days.

(21) Appl. No.: 16/373,089

(22) Filed: Apr. 2, 2019

(65) Prior Publication Data
US 2020/0320885 A1 Oct. 8, 2020

(51) Int. Cl.
*G08G 5/00* (2006.01)
*G07C 5/08* (2006.01)

(52) U.S. Cl.
CPC .......... *G08G 5/0034* (2013.01); *G07C 5/085* (2013.01); *G08G 5/0039* (2013.01)

(58) Field of Classification Search
CPC .... G08G 5/0034; G08G 5/0039; G07C 5/085; G06Q 10/00
See application file for complete search history.

(56) References Cited

U.S. PATENT DOCUMENTS 7,477,145 B2  1/2009  Tatton et al.
8,565,938 B2  10/2013  Coulmeau et al.
(Continued)

FOREIGN PATENT DOCUMENTS

CN  103295089      9/2013
EP  3007153 A2 *  4/2016  .......... G08G 5/0026
(Continued)

OTHER PUBLICATIONS

"Heathrow Airport-Structure of Aircraft Parking Charges," Decision Document, Jun. 17, 2011, https://www.heathrow.com/file_source/Company/Static/PDF/Partnersandsuppliers/Restructure_of_Parking_Charges-Decision_Document-2011.pdf.
(Continued)

*Primary Examiner* — James J Lee
*Assistant Examiner* — Shon G Foley
(74) *Attorney, Agent, or Firm* — Bookoff McAndrews, PLLC

(57) ABSTRACT

A method and system for providing cost data via an operating cost app for a flight associated with a flight plan, by a computing device including: obtaining cost data of the flight plan by executing the operating cost app to implement an operating cost integrator application integrated with the operating cost app to interface with a plurality of service providers for retrieving operating cost data of the flight plan from each of the service providers; obtaining, by the at least one processor, real-time aircraft performance parameters affecting the actual cost of the flight including: a landing time and a takeoff time; determining an actual cost of the flight by using software solutions of the operating cost app, and by calculating ground charges at the airport derived from the sensed data by the operating cost app and presenting the actual cost of the ground charge, via a display device for displaying.

20 Claims, 12 Drawing Sheets

(56) References Cited

U.S. PATENT DOCUMENTS

| | | | |
|---|---|---|---|
| 2009/0125222 A1* | 5/2009 | McCullough | G01C 23/00 |
| | | | 701/120 |
| 2014/0244077 A1 | 8/2014 | Laso-Leon et al. | |
| 2017/0132938 A1 | 5/2017 | Lax et al. | |
| 2017/0323239 A1 | 11/2017 | Johnson et al. | |

FOREIGN PATENT DOCUMENTS

| | | |
|---|---|---|
| EP | 3007153 A2 | 4/2016 |
| EP | 3154047 A1 | 4/2017 |

OTHER PUBLICATIONS

"Brussels Airport Charges & Fees at Brussels Airport", effective as from Apr. 1, 2017, https://www.brusselsairport.be/uploads/media/default/0001/12/f09fddadcddde19f05fbf8564f168d460087715c.pdf.

\* cited by examiner

COST REPORT — 710

| ASSUMPTIONS FOR A WEEK PER AIRCRAFT | METRICS | UNITS | | |
|---|---|---|---|---|
| 1. NO OF HALTS PER TRIP | 2 | NOS | | |
| 2. NO OF TRIPS PER WEEK | 2 | NOS | | |
| 3. PARKING TIME PER HALT | 4.5 | HOURS | | |
| TOTAL PARKING TIME | 18 | HOURS | | |
| LOSS PER TRIP | 1 | HOURS | | |
| TOTAL PARKING HOURS LOSS | 4 | HOURS | | |
| PARKING CHARGE PER HOUR | 1200 | INR | | |
| TOTAL MONEY SAVED | 4800 | INR | | |
| TOTAL PARKING CHARGE | 21600 | INR | | |
| PERCENTAGE SAVINGS PER WEEK | 22% | | | |
| ANNUAL SAVINGS | 249600 | INR | | |
| # OF AIRCRAFT IN THE FLEET | 5 | | | |
| ANNUAL SAVINGS FOR THE FLEET | 1248000 | INR | | 1.248 MILLION INR |

≡ BILLING     4:34 PM

AIRCRAFT
AIRCRAFT ID   UAL
AIRCRAFT TYPE   4B
AIRCRAFT REG   GVSITS
ORIGIN   KPHX
DESTINATION   KDVT
WEIGHT   75897

TIMING INFO (KPHX - KDVT)
TAKEOFF TIME   2016-3-1 12:26:0
TOUCHDOWN TIME   2016-3-1 12:6:0
PARKING TIME   20

INVOICE
LANDING   250
PARKING   33
NAV AIDS   100
ATC   60
PENALTY   0
  $443.00

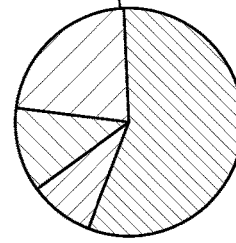
—1035

5. BILLING PAGE WITH CHART

≡ SIGN IN     4:34 PM

NOISE PENALTIES   250 db > 20 DECIBELS
LANDING PENALTIES   250 wt > 50k KG
LANDING CHARGES   250 wt > 20000 KG
PARKING CHARGES   100 PER 1 HOUR(S) MIN
ATC SERVICE CHARGES   100 PER 6 HOUR(S) MIN
NAVAIDS CHARGES   50 PER TO/LD MIN

4. AIRPORT SPECIFIC CHARGES

FIG. 10D

METHOD AND SYSTEM FOR ENABLING COMPUTATIONS TO ESTIMATE AND PREDICT COSTS WITH A COST INDEX BY AN OPERATING COST APP WITH AN OPERATING COST INTEGRATOR INTERFACE FOR DISPLAYING GATE TO GATE FLIGHT COSTS

TECHNICAL FIELD

Embodiments of the subject matter described herein relate generally to methods, and systems for managing operating and fuel costs of aircraft flights, and more particularly, embodiments of the subject matter relate to a system and method to integrate an operating cost integrator into an operating cost app to optimize, and estimate operating costs in gate-to-gate flight operations taking into account seasonal variations in costs and to provide an automated reporting of cost predictions with a cost index enabling enhanced monitoring and analysis of total flight costs realized in each flight.

BACKGROUND

Advances in aviation connectivity systems will enable a host of enhanced cloud applications and services that will benefit airline operational efficiency and safety. For example, pilots will benefit in part through improved electronic flight bag (EFB) applications connected to onboard and offboard data, while airlines will see efficiency gains through movement of operational data for applications for lowering costs, both on the ground and in the air. Further, the advent of cloud computing enables a single platform to handle and integrate data from multiple sources that, using real-time data analytics, can produce relevant insights in aircraft operations for cost savings.

In addition, different paradigms of transport will benefit from enhanced aircraft connectivity applications. For example, on-demand aviation, once thought to be unattainable in the near future, is now considered a viable mode of transportation with the potential to improve urban mobility, by enabling a network of small, electric aircraft that take off and land vertically known as VTOL (Vertical Take-off and Landing) aircraft for alternate modes of reliable transportation between cities and suburbs within cities. However, with on-demand aviation, hurdles remain. Among these hurdles are determining immediately all costs of each flight and charges incurred in a convenient manner.

This is because total flight costs are difficult to assess as there are numerous different costs for each flight that are expensed, for example costs for airport operations and aircraft parking fees in addition to the costs of the aircraft maintenance and fuel costs. Moreover, the operating and fuel costs require close monitoring to ensure the expenses are correctly calculated and paid to generate sufficient revenue generated per flight. Further, there are obstacles in transparency or visibility to the pilot of the operating costs for each flight as the costs have multiple components and are levied by different agencies. In addition, there are seasonal variations in costs; particularly with respect to costs that originate from different destination sources such as parking costs. Therefore, there exists a need for increased transparency of all costs incurred in real-time for gate to gate flight operations and to provide systems and methods that integrate all the costs, analyze the cost, estimate the costs, provide cost trends and provide reporting of cost predictions on an itemized basis for the pilot to play a role in validating the costs incurred.

Hence, it is desirable to improve the pilot's situational cost awareness in real-time of (but not limited too) ground operational and in-air costs by providing a system and method implementing an integrated operating cost app with an operating cost integrator (OCI) that collects, monitors, communicates and analyzes cost data related to each flight for display to the flight crew and to airport ground personnel throughout the flight. This operating cost app system and method can empower the pilot to make key critical decisions with respect to flight and ground operational events in-air and on the ground to try to save costs, or can save costs resulting in achieving cost performance increases for each flight.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and system to integrate an operating cost integrator into an operating cost app to optimize, and estimate operating costs in gate-to-gate flight operations taking into account seasonal variations in costs and to provide an automated reporting of cost predictions with a cost index enabling enhanced monitoring and analysis of total flight costs realized in each flight.

In one exemplary embodiment, a method for providing cost data via an operating cost app for a flight associated with a flight plan, by a computing device onboard an aircraft, the computing device including at least one processor coupled with a system memory element for storing instructions to implement the operating cost app is disclosed. The method includes: obtaining cost data of the flight plan, by the at least one processor, executing the operating cost app to implement an operating cost integrator (OCI) application integrated with the operating cost app to interface with a plurality of service providers for retrieving direct and indirect operating cost data of the flight plan from each of the service providers wherein the cost data includes a predetermined cost index for the flight plan under anticipated conditions; obtaining, by the at least one processor, real-time aircraft performance parameters affecting the actual cost of the flight for configuring the operating cost app wherein the real-time aircraft performance parameters at least include: a landing time and a takeoff time at an airport by the aircraft; monitoring continuously, by the at least one processor, during the flight, one or more sets of costs sent to the operating cost app from the plurality of service providers to determine the actual cost of the flight; determining, by the at least one processor, an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters include: an actual landing time and an actual takeoff time; automated billing, by the at least one processor by automated invoicing operations of the operating cost app, to send an invoice to an operator of the aircraft of the ground charge calculated by the operating cost app taking into account seasonal variations in costs at the airport wherein the operating cost app attempts to identify a potential cost savings of a cost difference over the actual cost of the ground charge, and the cost provided by the service provider of the ground charge based on an actual landing and takeoff times; and presenting the actual cost of the ground charge, via a display device communicatively coupled to the at least one processor for displaying and validating in real-time by flight personnel during the flight.

In various exemplary embodiments, the method includes: obtaining cost data related to the flight plan, by the operating cost app, by configuring the operating cost integrator application to receive cost data from an operating cost database located at a server at each airport on the flight plan. The method, further includes: obtaining historic cost performance data for the flight plan and a predetermined cost index of the flight plan under anticipated conditions, by the at least one processor; obtaining the real-time aircraft performance parameters affecting the actual cost of the flight, using continuous monitoring during of the flight; and creating a real-time model based on the historic cost performance data, the predetermined cost index, and the real-time aircraft performance parameters for predicting cost data. The operating cost database includes cost data including: parking costs, gate costs, aircraft handling costs, and penalty costs. The operating cost integrator application integrates cost data from a plurality of entities at least including: airport authorities, regulatory agencies, and route navigation facilities. The method, further includes: calculating, by the at least one processor, the cost data for route navigation costs corresponding to the flight plan and aviation systems of the aircraft using the operating cost app to determine a cost savings of a cost difference between a cost target based on the flight plan costs and the actual cost wherein the cost savings includes at least the cost difference between the cost target and the actual cost.

In another embodiment, a computing device onboard an aircraft, the computing device for providing cost data for a flight associated with a flight plan. The computing device includes: a system memory element; a display device, configured to present graphical elements and text associated with the cost data for the flight associated with the flight plan; and at least one processor communicatively coupled to the system memory element and the display device, the at least one processor configured to: obtain cost data of the flight plan by executing the operating cost app to implement an operating cost integrator application integrated with the operating cost app to interface with a plurality of service providers for retrieving direct and indirect operating cost data of the flight plan from each of the service providers wherein the cost data includes a predetermined cost index for the flight plan under anticipated conditions; obtain real-time aircraft performance parameters affecting the actual cost of the flight for configuring the operating cost app wherein the real-time aircraft performance parameters at least include: a landing time and a takeoff time at an airport by the aircraft; monitor during the flight, a plurality of costs sent to the operating cost app from the plurality of service providers to determine the actual cost of the flight; determine an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters include: an actual landing time and an actual takeoff time; invoice, by automated billing operations of the operating cost app, costs to an operator of the aircraft of the ground charge calculated by the operating cost app taking into account seasonal variations in costs of the airport wherein the operating cost app attempts to identify a potential cost savings of a cost difference over the actual cost of the ground charge, and the cost provided by the service provider of the ground charge based on the actual landing and takeoff times; and present the flight plan costs, via the operating cost app on the display device.

In various exemplary embodiments. the at least one processor is further configured to: obtain cost data related to the flight plan, by the operating cost app, by configuring the cost integrator application to receive cost data from an operating cost database located at a server at each airport on the flight plan. The computing device further includes: a user interface configured to receive user input selections to the computing device, wherein the user interface is communicatively coupled to the at least one processor; wherein the at least one processor is further configured to present itemized cost data responsive to user input selections by the operating cost app. The at least one processor is further configured to: obtain historic cost performance data for the flight plan and a predetermined cost index of the flight plan under anticipated conditions, by the at least one processor; obtain the real-time aircraft performance parameters affecting the actual cost of the flight, using continuous monitoring of the flight; and create a real-time model based on the historic cost performance data, the predetermined cost index, and the real-time aircraft performance parameters for use to predict cost data. The operating cost database includes cost data including: parking costs, gate costs, aircraft handling costs, and penalty costs. The operating cost integrator application integrates cost data from a plurality of entities at least including: airport authorities, regulatory agencies, and route navigation facilities. The at least one processor is further configured to: calculate the cost data for route navigation costs corresponding to the flight plan and aviation systems of the aircraft using the operating cost app to determine a cost savings of a cost difference between a cost target based on flight plan costs and the actual cost wherein the cost savings includes at least the cost difference between the cost target and the actual cost.

In yet another embodiment, a non-transitory, computer-readable medium containing instructions thereon, which, when executed by a processor, perform a method for providing cost data for a flight associated with a flight plan, by a computing device onboard an aircraft, the computing device including the processor and a system memory element is disclosed. The method includes: obtaining cost data of the flight plan, by the processor, executing the operating cost app to implement an operating cost integrator application integrated with the operating cost app to interface with a plurality of service providers for retrieving direct and indirect operating cost data of the flight plan from each of the service providers wherein the cost data includes a predetermined cost index for the flight plan under anticipated conditions; obtaining, by the processor, real-time aircraft performance parameters affecting the actual cost of the flight for configuring the operating cost app wherein the real-time aircraft performance parameters at least include: a landing time and a takeoff time at an airport by the aircraft; monitoring continuously, by the processor, during the flight, a plurality of costs sent to the operating cost app from the plurality of service providers to determine the actual cost of the flight; determining, by the processor, an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters include: an actual landing time and an actual takeoff time; automated billing, by the processor by executing automated invoicing operations performed by the operating cost app, to send an invoice to an operator of the aircraft of the ground charge calculated by the operating cost app taking into account seasonal variations in costs at the airport wherein the operating cost app attempts to identify a potential cost savings of a cost difference over the actual cost of the ground charge, and the cost provided by the service provider of the ground charge based on the actual landing and takeoff times; and presenting the actual cost of the ground charge, via a display device communicatively coupled to the at least one processor for displaying and validating in real-time by flight personnel during the flight.

In various exemplary embodiments, the non-transitory, computer-readable medium, further includes: obtaining cost data related to the flight plan, by the operating cost app, by configuring the cost integrator application to receive cost data from an operating cost database located at a server at each airport on the flight plan; obtaining historic cost performance data for the flight plan and a predetermined cost index of the flight plan under anticipated conditions, by the at least one processor; obtaining the real-time aircraft performance parameters affecting the actual cost of the flight, using continuous monitoring during of the flight; and creating a real-time model based on the historic cost performance data, the predetermined cost index, and the real-time aircraft performance parameters for use in predicting cost data trends. The operating cost database includes cost data including: parking costs, gate costs, aircraft handling costs, and penalty costs. The operating cost integrator application integrates cost data from a plurality of entities at least including: airport authorities, regulatory agencies, and route navigation facilities. The non-transitory, computer-readable medium, further includes: calculating, by the at least one processor, the cost data for route navigation costs corresponding to the flight plan and aviation systems of the aircraft using the operating cost app to determine a cost savings of a cost difference between a cost target based on flight plan cost and the actual cost wherein the cost savings includes at least the cost difference between the cost target and the actual cost. The non-transitory, computer-readable medium, wherein creating the real-time model further includes: obtaining historic cost performance data for the flight plan and a predetermined cost index of the flight plan under anticipated conditions, by the processor; obtaining the real-time aircraft performance parameters affecting the actual cost of the flight, using continuous monitoring during the flight, wherein the real-time aircraft performance parameters include at least aircraft ground operation times and aircraft weight; creating the real-time model based on the historic cost performance data, the predetermined cost index, and the real-time aircraft performance parameters of ground time operation times and aircraft weight; and forecasting trends of the actual cost from the cost target based on the flight plan using the real-time model to identify cost savings from changes in the flight plan as the flight progresses, by the processor.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 illustrates a diagram of an exemplary graphical user interface to show cost savings data of the operating cost app, in accordance with an embodiment;

DETAILED DESCRIPTION

Figure 1:
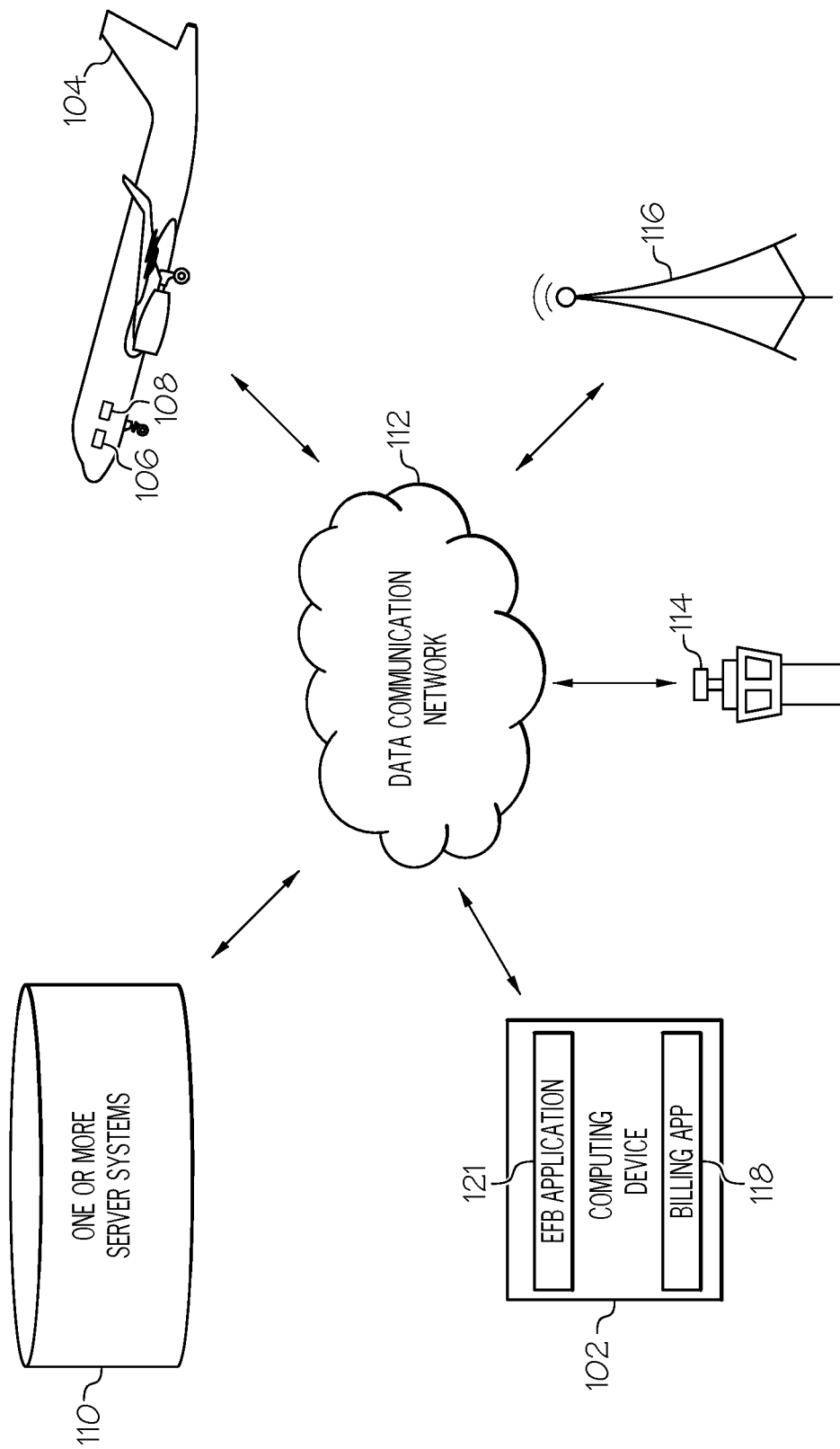
FIG. 1 illustrates an exemplary diagram of communication network of the operating cost app, in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The Next Generation (NextGen) overhaul of the United States airspace system and the companion Single European Sky ATM Research (SESAR) overhaul of the European airspace system creates various mechanisms to improve air traffic management on those continents. Some solutions aim at increasing connectivity and information flow through the airspace in order to maximize efficiency and provide internet of things (IoT) operations between aircraft and ground operations in designated airspaces. These connected cloud-based services can be configured in an open architecture framework that allows users to engage and benefit from stored, sensed and real-time event data about the aircraft operation that had not been accessible in the past. For example, Software-as-a-Service (SaaS) models can be configured to enable subscription models to access via the cloud to provide comprehensive costs incurred, estimated or predicted with aircraft flight phases by connectivity with multiple disparate data sources.

In addition, the electronic flight bag (EFB) solutions, which include electronic display systems for the flight deck or cabin crew member use can be connected used with operating cost applications. For example, EFB devices can display a variety of aviation data or perform basic calculations (e.g., performance data, fuel calculations, etc.) that can be integrated with corresponding billing data.

A primary goal of commercial airlines and non-commercial aircraft operators is to operate an aircraft from an origin location to a destination location as safely as possible and at the lowest cost. Such operations may include scheduled and unscheduled flights for an airline, business jet operations, rotary wing aircraft operations (e.g., helicopter operations), unmanned aerial vehicles (UAVs), and the like. Day-to-day operational costs and revenues for aircraft can vary due to fuel-related cost variations, time-related cost variations, delay costs, load factor costs, and the like. In the case of commercial airlines, air route profitability may be analyzed by continuously determining whether a specific flight sector is profitable during a given time period, and air route profitability analysis produces metrics that may be used to determine whether to alter, supplement, or exclude routes from an airline schedule. Hence, an operating cost app can be configured to provide cost control analysis in real-time and provide base-line recommended target operational costs for a given flight. This can result, in a multitude of cost reductions in various types of aircraft operations so that profitability can be increased. The operating cost app by identifying and monitoring costs, and taking advantage of cost control opportunities from un-realized cost data and presenting the data can enable a pilot to make flight control recommendations to optimize revenue per flight.

Further, it is common knowledge that airlines cannot compete on price without reducing their costs and overheads. The airline industry relies on airport services, such as aviation fuel, labor, parking etc. Moreover, commercial carriers, particularly the legacy carriers are dependent on costly distributive networks for invoicing of costs incurred that include direct operating costs, indirect operating costs, and overheads. The direct operating costs are costs incurred as a direct result of the operation of a specific service; for example, the fuel consumed on a flight. The indirect operating costs are costs incurred for a whole period of time, such as an operating season; for example, the parking costs and the pilot salaries. The overhead costs are incurred for even longer periods, such as the buildings, or the aircraft lease costs. There is currently given the complexity of the costs that are invoiced per flight, a lack of sufficient cost awareness by the pilot in real-time during a flight and on a per flight basis to enable the pilot to play a decision making role in cost reductions for the flight.

The airline also operates aircraft based on cost index for cost estimation determinations on each flight and the cost index is issued currently as monthly or quarterly basis plan. This is assuming the time and fuel based costs are fixed for this period. However, this model is not as dynamic as day-to-day operational situations related to schedule variance costs etc. Hence there is a need for dynamic cost indexing, which encompasses the ability to manage schedule variance costs for any given flight on a dynamic basis in an operational context and considering other temporal factors such as crew schedule, aircraft rotation, time-dependent maintenance cost, aircraft parts, service interventions by air traffic controllers, parking costs, penalties, etc.

Many airlines have significant barriers to identifying which costs should be included in "time cost" calculations and how to quantify them. The key challenge is to monitor and manage flight schedule costs on a dynamic basis and make changes such as trading accelerated fuel burn against the "time cost" to manage overall costs. This requires means to identify and display costs so that the pilot can make the appropriate operational changes to manage the costs.

That is, many case studies reveal that pilots can play a key role (or a collaborative role) in the decision-making process and partake in cost containment strategies. However, the pilot's ability to play a cost savings function is in part based on the available resources and information about costs with respect to aircraft operations available and displayed in the cockpit. Currently, a crew has limited visibility in real-time of flight costs incurred and further is likely unaware of the historic costs, ongoing indirect costs etc. of a flight (i.e. the crew will likely not know how performance affects the route profitability).

Hence, it is desirable to provide methods and system that enable the flight crew to identify the operating costs and the potential saving opportunity. This objective can be achieved by determining costs incurred and the impact of flight costs through the continuous monitoring of flight costs by an operating cost app and subsequent pilot manual changes or by adaptive cockpit automation (i.e. by connected FMS and/or EFB or any avionics system solutions) that can make changes to save costs.

Another attempt to save costs at airports, is by airport collaborative decision making with the pilot and this process was developed as a joint venture methodology between ACI Europe, EUROCONTROL, International Air Transport Association (IATA) and the Civil Air Navigation Services Organization (CANSO) aiming to improve the operational efficiency of all airport operations by reducing delays, increasing the predictability of events as the flight progresses and optimizing the utilization of local resources.

Hence, it is desirable to alleviate pilot collaborative decision making responsibilities by providing an apparatus and method that provides an automated methodology for displaying, notifying and communicating flight costs to the pilot during the course of a flight and in particular during ground operations at embarkation and arrival destinations.

The present disclosure describes a display, notification and communication of cost data in a method and system that uses an operating cost app configured with a graphic user interface for receiving the cost data of an actual destination (i.e. aerodrome) and of real-time events via the operating cost app with an operating cost integrator application configured for collaborative communication and display of costs that considers all the inputs of cost data about the aircraft and the airport operations (i.e. aerodrome traffic management) to increase the accuracy of the comprehensive cost data received and enable well-informed decision making based on real-time displays of itemized cost information.

In various exemplary embodiments, the present disclosure describes a graphical user interface with an operating cost app that provides a method and system to identifying condition information of costs at embarkation, at and during touchdown, in-air, and at an approach/arrival at a destination airport.

In various exemplary embodiments, the present disclosure describes the use of corrected cost data that are published and corrected for a particular flight segment which can communicated to the ground (i.e. aerodrome) controllers through a data link or any other aspects based on the pilot's acknowledgment and incorporated in the time scale for display to the pilot. This aids the operating cost app to adhere to any standard operating procedure set by local authorities.

In various exemplary embodiments, the present disclosure describes systems and methods for multi-platform use of an operating cost app to display actual cost data and that uses a graphic user interface that provides verifications or checks by cross communications with the pilot and ground personnel of identifying conditions related to costs.

In various embodiments, the present disclosure describes a graphic user interface method and system that receives and presents actual costs incurred in the flight from the cost data from service providers as well as from cost data locally calculated and presents the cost data in the graphic user interface to enhance the pilot's situational cost awareness and to enable cross communications of the pilot and the ATC or ground personnel for collaborative decision making to contain costs. In addition, the cost data can be presented on a GUI based on a time that validates and receives the cost data as inputs in real time from multiple stakeholders and entities involved in the ground operations.

In various exemplary embodiments, the present disclosure describes systems and methods that enable the display of cost data on various displays such as a PFD and HUD in the cockpit (or on a mobile device connected to the aircraft or other ground aviation systems).

In various exemplary embodiments, the present disclosure describes systems and methods that enable the displays of charts of costs when in-air and in-flight and further to display the cost data information of the gate and ground traffic information as itemized expenses.

In an exemplary embodiment, the HONEYWELL® GODIRECT™ Services can be configured to provide enhanced flight optimizations and for presenting cost data to pilots on particular flight segments or when approaching airports. The HONEYWELL®'s "Single Pane display of Glass Cockpit Operations" (SPOG) with the HONEYWELL GODIRECT™ Ground connectivity can provide seamless support, integration and use of the cost data and displays of the cost data in an operating cost app system as described herein. All the ground operations using this type of unified platform will eventually be part of the cockpit display. Hence, all ground operational events pertaining to airport cost data can be conveniently presented to the pilot allowing more decision making on the part of the pilot with respect to which ground operations to perform or skip. As an example of application integration, for use in conjunction with the operating cost app, HONEYWELL's GoDirect™ Flight Efficiency software can provide data analysis that empower pilots to lower costs and to optimize fuel efficiency across flight operations, and ground operations. In addition, the HONEYWELL®'s connected aircraft solutions can focus on fetching ground cost data onto cockpit displays.

In various exemplary embodiments, the present disclosure describes methods and systems to obtain cost data of the flight plan, by an operating cost app with operating cost integrator to interface with service providers for retrieving direct and indirect operating cost data of the flight plan from each of the service providers ant to include a predetermined cost index. In addition, the operating cost app is configured to retrieve aircraft performance parameters that can affect the actual cost of the flight and to determine by using software solutions the actual costs. For example by calculating ground charges at the airport based on aircraft sensor data.

In various exemplary embodiments, the present disclosure describes methods and systems for automated invoicing operations of the operating cost app, to send an invoice to an operator of the aircraft of the ground charge calculated by the operating cost app taking into account seasonal variations in costs at the airport to identify a potential cost savings.

Turning now to the figures, FIG. 1 is a diagram of a system 100 for providing real-time cost data and options for cost recovery, in accordance with the disclosed embodiments. The system 100 operates to compute and present dynamic, real-time, cost data, onboard an aircraft 104 during flight. In circumstances where an actual cost of a current flight exceeds planned cost targets, then the system 100 operates to compute and present dynamic, real-time, cost recovery options, onboard the aircraft 104 during flight. The system 100 may include, without limitation, a computing device 102 that communicates with one or more avionics systems 106, including at least a Flight Management System (FMS) 108, onboard the aircraft 104 and one or more server systems 110, via a data communication network 112. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of hosting, maintaining, and executing an operating cost app 118 and an Electronic Flight Bag (EFB) application 121 configured to determine and present flight modeling data, flight cost data (e.g., actual cost data, cost projection data, cost target data), and flight plan/operation change options. In other embodiments, the computing device 102 may be implemented using a computer system onboard, and integrated into, the aircraft 104, wherein the computing device 102 is configured to determine and present flight modeling data, flight cost data, and flight plan change options.

The aircraft 104 may be any aviation vehicle for which flight cost modeling and flight cost recovery options are relevant and applicable during completion of a flight route. The aircraft 104 may be implemented as an airplane, helicopter, spacecraft, hovercraft, an unmanned aerial vehicle (UAV), or the like. The one or more avionics systems 106 include the FMS 108, and may also include Automatic Dependent Surveillance-Broadcast (ADS-B) devices, navigation devices, weather radar, brake systems, or the like. Data obtained from the one or more avionics systems 106 and the FMS 108 may include, without limitation: flight data, weather data, brake system data, weight, and balance data, runway analysis data, aircraft performance data, or the like.

The air traffic control (ATC) 114 may be an air traffic control station or any other ground-based location from which personnel communicates with the aircraft 104, including the ground-based personnel and equipment concerned with monitoring and controlling air traffic within a particular area. The ATC 114 functions to communicate with the aircraft 104 to facilitate cost events, including receiving clearance requests from the aircraft 104 for user-selected flight plan change options, and communicating approval or denial to the aircraft 104 for a received clearance request. The ATC 114 is also representative of a flight operation control ground station, and may provide other communications to the aircraft 104, including but not limited to: historic flight route performance data, cost parameter data, terminal area broadcast data, air traffic control broadcast data, current and historical weather data, current and historic NOTAM data, and the like.

In certain embodiments, the aircraft 104 and/or the computing device 102 receives all of the data from the ATC 114 (or other ground control station), and us data to compute and predict costs by the operating cost app 118 that may allow cost recovery during a flight. In this scenario, the ATC 114 or other ground control station may receive data from other sources (e.g., the one or more server systems 110, airline data management, historic flight route data sources, weather data sources, NOTAM data sources, terminal area broadcast sources, or the like). However, in other embodiments, the aircraft 104 and/or the computing device 102 communicates directly with external sources to obtain the cost data that is used to compute flight change options for cost recovery during a flight, including: (i) the one or more server systems 110 (e.g., parking fee data at an airport, penalties for delays at airports, third-party services providing weather data and NOTAM data, airline data management, historical cost data, routes and seasonal costs variations), (ii) the Traffic Information Service-Broadcast (TIS-B) 116, (iii) the ATC 114, and any other source of data applicable to compute cost data and flight operation options for achieving cost savings during a flight.

The one or more server systems 110 may include any number of application servers, and each server may be implemented using any suitable computer. In some embodiments, the one or more server systems 110 includes one or more dedicated computers. In some embodiments, the one or more server systems 110 includes one or more computers carrying out other functionality in addition to server operations. The one or more server systems 110 may store and provide any type of data used to compute flight plan alternatives for parking costs, fuel costs, and savings when the actual cost of a flight exceeds a cost target for the flight. Such data may include, without limitation: flight plan data, air traffic control broadcast data, terminal area broadcast data, third-party services data (e.g., weather data, Notices to Airmen (NOTAM) data, historic flight route data, historic aircraft performance data, airline data management data, flight cost parameter data, cost deviation parameter data, aircraft performance and operational capability data, and other data compatible with the computing device 102.

The computing device 102 is located onboard the aircraft 104, and the computing device 102 communicates with the one or more avionics systems 106 via wired and/or wireless communication connection. The computing device 102 and each of the one or more server systems 110, the air traffic control 114, and the Traffic information service-broadcast (TIS-B) 116, are generally disparately located, and the computing device 102 communicates with each of the one or more server systems 110, the air traffic control 114, and the TIS-B 116, via the data communication network 112 and/or via other communication mechanisms onboard the aircraft 104. The data communication network 112 may be any digital or other communications network capable of transmitting messages or data between devices, systems, or components. In certain embodiments, the data communication network 112 includes a packet switched network that facilitates packet-based data communication, addressing, and data routing. The packet switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 obtains relevant cost data associated with a particular flight, including anticipated costs for conditions for the particular flight and a cost target for the particular flight based on the flight plan, from air traffic control 114, TIS-B 116, and the one or more server systems 110. During flight onboard the aircraft 104, the computing device 102 continuously and dynamically obtains aircraft parameter data, such as the aircraft weight and ground times from the plurality of avionics systems 106 and the FMS 108, and creates a real-time model for the flight to perform a cost analysis of actual costs such as ground costs (i.e. parking costs based on touch and take off times), actual fuel costs etc. The computing device 102 uses the real-time model and the obtained relevant data, during the flight, to identify changes that can potentially be made to the flight plan to obtain cost savings for the flight. In some embodiments, the computing device 102 uses the real-time model and the obtained relevant cost data, during the flight, to determine whether an actual cost for the flight (which is updated in real-time) is projected to exceed the cost target, and to identify changes that can potentially be made to the flight plan to recover some of the costs exceeding the cost target. The computing device 102 presents the potential flight plan changes (i.e., flight plan change options) for flight crew viewing and selection. The computing device 102 is further configured to receive a user input selection and upload, link, or otherwise transmit the user-selected flight plan change option to the FMS 108, thereby initiating action by the FMS 108 to alter the flight plan according to the user selection for cost recovery. Additionally, the computing device 102 is configured to continuously and dynamically obtain real-time aircraft parameters and to update the real-time model continuously throughout the flight. Such dynamic, real-time obtained aircraft parameters consider aircraft parameters that are updated in real-time, which may alter previously-calculated flight plan change options at any point while the aircraft is traveling during the flight (e.g., recommendations calculated prior to the flight).

Figure 2:
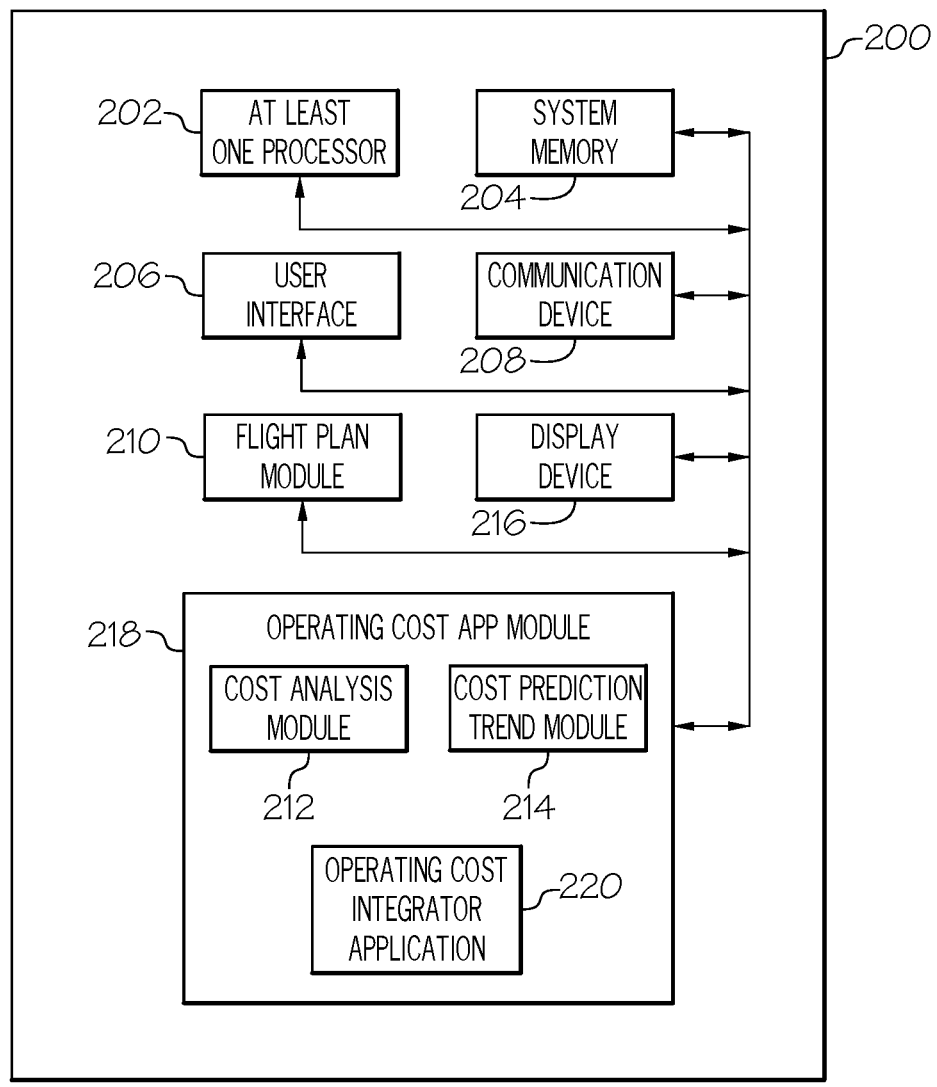
FIG. 2 illustrates an exemplary diagram of a configuration of the operating cost app with various processing modules, in accordance with an embodiment.

FIG. 2 is a functional block diagram of a computing device 200 used as part of a system for providing real-time cost data and options for cost savings, in accordance with the disclosed embodiments. It should be noted that the computing device 200 can be implemented with the computing device 102 depicted in FIG. 1. In this regard, the computing device 200 shows certain elements and components of the computing device 102 in more detail. The computing device 200 generally includes, without limitation: at least one processor 202; system memory 204; a user interface 206; a communication device 208; a flight plan modeling module 210; a cost analysis module 212; a cost savings prediction module 214; and a display device 216. These elements and features of the computing device 200 may be operatively associated with one another, coupled to one another, or otherwise configured to cooperate with one another as needed to support the desired functionality, in particular, continuously and dynamically updating a real-time model of a flight, during the flight, and providing potential flight change options for cost savings and cost recovery during the flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the identification of flight change options for cost recovery techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with real-time modeling of a particular flight for a particular aircraft, associated cost target data and actual cost data, and user-selectable options for changing the flight plan for cost savings and cost recovery purposes, and graphical elements associated with real-time modeling and cost savings. The system memory 204 may be realized using any number of devices, components, or modules, as appropriate to the embodiment. Moreover, the computing device 200 could include system memory 204 integrated therein and/or system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to select a presented flight change option for upload into a Flight Management System (FMS) onboard an aircraft, such that the flight change option might be implemented for cost savings purposes, as described herein. In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The communication device 208 is suitably configured to transmit signals from the computing device 200, and to receive data transmissions from one or more remote servers (see reference 110, FIG. 1); one or more avionics systems onboard an aircraft (see reference 106, FIG. 1); one or more broadcast transmission sources (see reference 116, FIG. 1); one or more air traffic control centers and/or ground control operations centers (see reference 114, FIG. 1); or the like. The communication device 208 may transmit and receive communications over a wireless local area network (WLAN), the Internet, a satellite uplink/downlink, a cellular network, a broadband network, a wide area network, or the like. In some embodiments, the communication device 208 is representative of the wired/wireless communication hardware described previously, and is also representative of an aircraft onboard transponder, such as an Automatic Dependent Surveillance-Broadcast (ADS-B) device that is configured to receive broadcast communications from other aircraft, air traffic control, a Terminal Information Service-Broadcast (TIS-B) data provider, or the like. The communication device 208 is compatible with the communication protocol described previously (see reference 112, FIG. 1), and may leverage conventional design concepts that need not be described in detail here.

As described in more detail below, data received by the communication device 208 may include, without limitation: flight plan data, air traffic control broadcast data, terminal area broadcast data, third-party services data (e.g., weather data, Notices to Airmen (NOTAM) data, historic flight route data, historic aircraft performance data, airline data management data, flight cost parameter data, cost deviation parameter data, aircraft performance and operational capability data, and other data compatible (i.e. data from the operating cost database) with the computing device 200. Data provided by the communication device 208 may include, without limitation: user selections of flight plan change options, air traffic control (ATC) clearance requests, flight crew acknowledgment communications, and the like.

The operating cost app is configured in an operating cost app module 218 to monitor and display cost data based on flight plan data from the flight plan modeling module 210 and includes a cost analysis module 212, and a cost savings prediction module 214. In addition, an operating cost integrator module 220 is configured in the operating cost app module 218 to connect with disparate cost data sources for enabling the operating cost app module 218 with EFB solutions to generated cost reporting in real-time during a flight. The flight plan modeling module 210 is configured to create a real-time model of a particular flight under anticipated conditions. The real-time model provides flight data analysis and cost data analysis used to determine an actual cost of the current flight based on anticipated conditions (e.g., weather data, NOTAM data), historic route data, historic aircraft parameter data from one or more avionics systems onboard the aircraft, and historical cost data associated with the route for the flight. To create and update the real-time model, the flight plan modeling module 210 incorporates cost target data for a particular execution of the flight, aircraft performance parameters including aircraft parking times, aircraft weights etc. used during execution of the flight, weather impact of the execution of the flight, and descent timing deviations occurring during execution of the flight. The flight plan modeling module 210 continuously and dynamically updates the real-time model throughout the flight, in real-time, based on new and updated current aircraft performance parameters and flight conditions data.

The cost analysis module 212 is configured to continuously monitor the real-time model (created, updated, and maintained by the flight plan modeling module 210) to obtain an updated actual cost continuously based on cost data from the operating cost integrator module (220) throughout the execution of the flight. Executing the flight is the aircraft action of flying from the departure location to a planned arrival location. The cost analysis module 212 uses the real-time model to assess flight conditions and aircraft parameters that can change during the course of executing the flight, to update the actual cost based on the changing light conditions and aircraft parameters, and to use the continuously updated actual cost data to determine when the actual cost of executing the flight exceeds the predetermined cost target for the flight.

The cost savings prediction module 214 is configured to use the real-time model (created, updated, and maintained by the flight plan modeling module 210) to identify and present optional changes to the flight plan that, if implemented, would decrease the cost of executing the flight. The cost analysis prediction module 214 identifies potential changes to the flight plan that permit completion of the flight from the original departure location to the original arrival location and predicts a cost associated with each of the potential changes, using the real-time model. The cost associated with each flight plan change option may be higher or lower than the originally projected cost target for the flight. A cost target (based on the flight plan) for the flight is a planned and budgeted monetary price to fly the aircraft from the departure location to the arrival location. In other words, the cost target is the anticipated cost of the flight from an origin point to a destination point. The flight crew may change the flight plan to lower the flight costs such as spend less time parked at the airport and recover some of the cost for the flight.

In practice, the operating cost app module 218, the flight plan modeling module 210, the cost analysis module 212, and/or the cost savings prediction module 214 may be implemented with (or cooperate with) the operating cost integrator module 220 and the at least one processor 202 to perform at least some of the functions and operations described in more detail herein. In this regard, the operating cost app module 218, the flight plan modeling module 210, the cost analysis module 212, and/or the cost savings prediction module 214 with the operating cost integrator module 220 may be realized as suitably written processing logic, application program code, or the like.

The display device 216 is configured to display various icons, text, and/or graphical elements associated with the operating cost app and the real-time modeling of a flight and potential modifications to a current flight plan to achieve cost savings or cost recovery for the flight (i.e., flight plan change options). In an exemplary embodiment, the display device 216 is communicatively coupled to the user interface 206, the operating cost app module 218 and the at least one processor 202. The at least one processor 202, the user interface 206, and the display device 216 are cooperatively configured to display, render, or otherwise convey one or more graphical representations or images associated with real-time modeling of a flight and flight plan change options on the display device 216, as described in greater detail below. In an exemplary embodiment, the display device 216 is realized as an electronic display configured to graphically display real-time modeling data, cost data, and flight plan change options, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
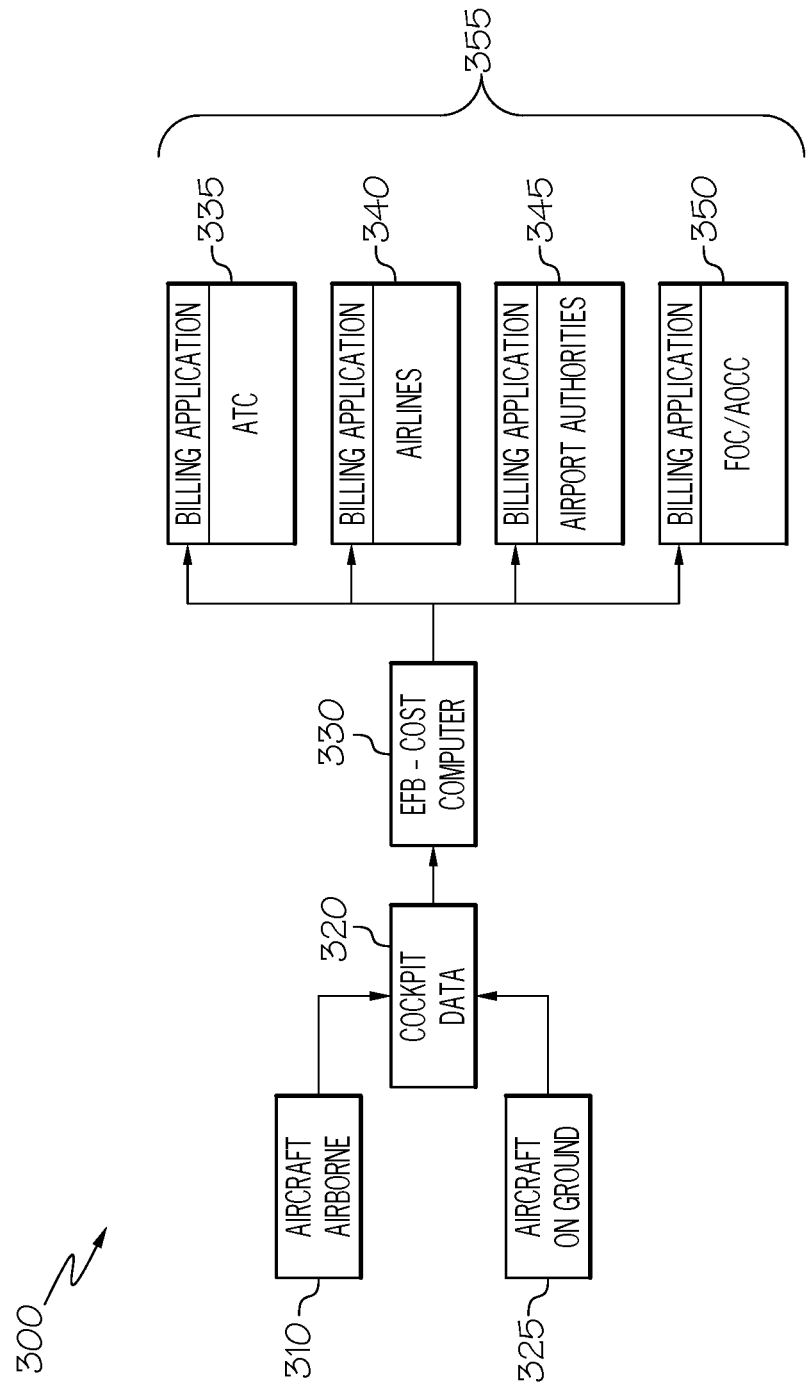
FIG. 3 illustrates a high-level diagram of cockpit sharing data to an electronic flight bag by an operating cost application, in accordance with an embodiment.

FIG. 3 illustrates a high-level diagram of cockpit sharing data to an electronic flight bag by an operating cost application in accordance with an embodiment. In FIG. 3, an integration of wireless data loading features of wireless databases to cockpit systems configured with an operating cost app 300 is depicted. When the aircraft is airborne (i.e. in-air) 310 or the aircraft is on the ground 325, the cockpit data 320 which is generated can be connectively connected to an electronic flight bag (EFB) 330 for sharing of identified billing data (i.e. cost data). The EFB 330 through an operating cost app 300 can function in part as a data repository and can share data (including cost data) of the flight to the ground systems (i.e. cloud based server systems configured with ground operations) through an approved wireless channel. This enables cost data to be collected from the aircraft while it is on the ground and is airborne. The aircraft cost data for billing generated from the aircraft operating cost app 300 can be shared (i.e. by modules 355 configured with respective operating cost applications of the operating cost app 300) to the air traffic control (ATC) by an ATC operating cost application 335, to airlines by airline operating cost application 340, to airport authorities by airport operating cost application 345, and to flight operations control center (FOC) and/or airline operations control Center (FOC/AOCC) by FOC/AOCC operating cost application 350 in a synchronized manner. The operating cost app 300 and the respective billing modules 355 (i.e. integrating operating cost applications 335, 340, 345 and 350) can be installed across the ground systems.

As an example, a wireless data loader (not shown in FIG. 3) can be configured and integrated in the cockpit systems for enabling cockpit data 320 to securely and wirelessly connect with a HONEYWELL® PRIMUS EPIC® cockpit and the functions of enabling wireless database loading (ex. parking cost database), and a gateway for maintenance service costs and other mobile analytic apps. The wireless data loader enables connectivity to the PRIMUS EPIC® cockpit through a tablet device, such as an IPAD®, via mobile apps such as the operating cost app 300. The connectivity can occur by GoDirect™ access and can include per-device billing, per-flight leg billing and department billing for assisting in controlling costs. The GoDirect™ access also provides commercial carriers tools to manage inflight Wi-Fi® access and control data costs that are presented by the operating cost app 300 while still allowing passengers to connect to the internet.

Figure 4:
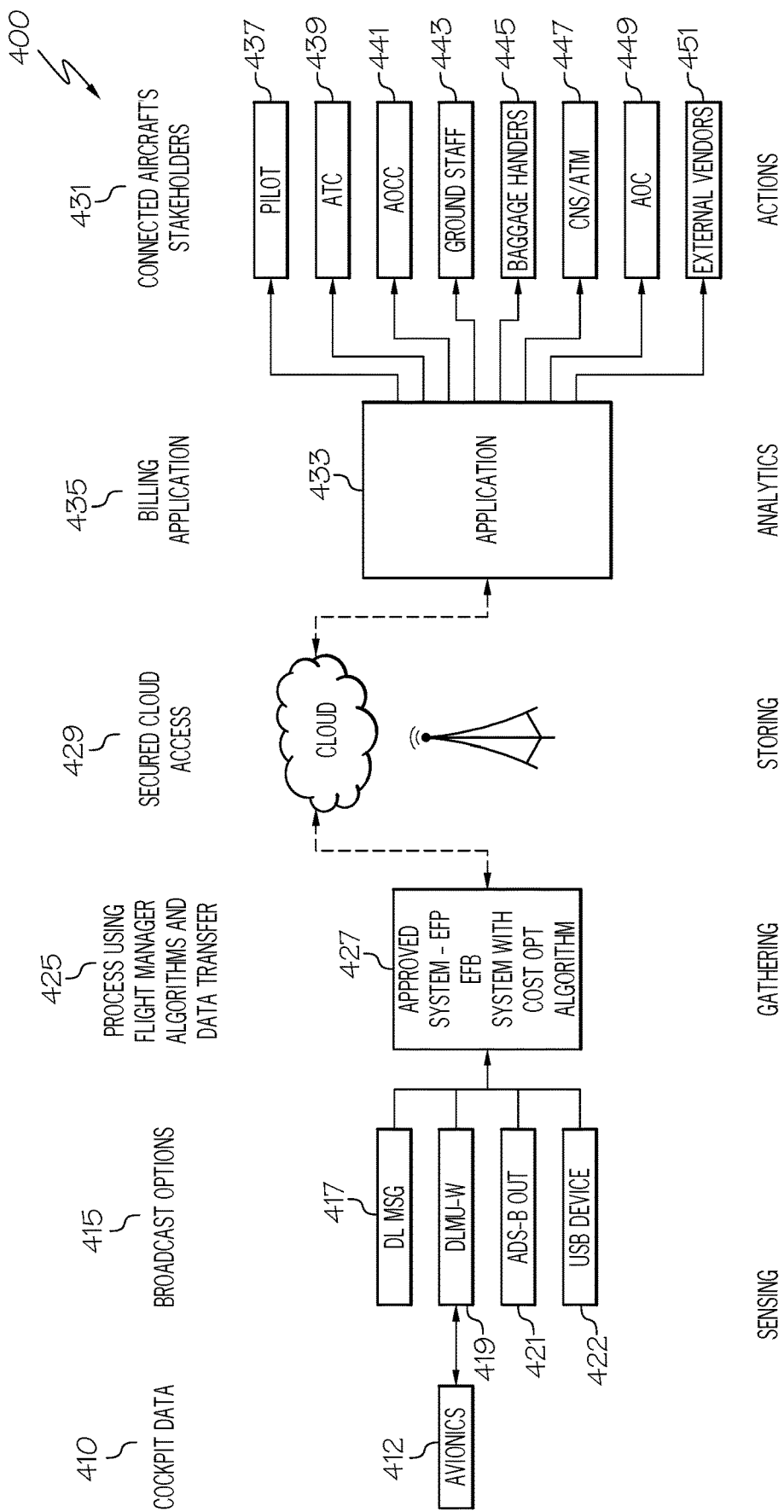
FIG. 4 illustrates an exemplary diagram of a processing pipeline for collecting and analyzing the cost data for the operating cost app, in accordance with an embodiment.

FIG. 4 illustrates an exemplary diagram of a processing pipeline for collecting and analyzing the cost data for the operating cost app in accordance with an embodiment. In FIG. 4, the cockpit data 410 is sensed aircraft sensors (not shown) and sent to various avionic systems 412 is broadcast 425 by a number of options (i.e. approved channels) including a DL msg 417, a DMU-W 419, an ADS-B out 421 and USB device 422 to approved EFB systems 427. The EFB systems 427 are configured with cost optimization algorithms. In various exemplary embodiments, flight management algorithms with data transfer may be implemented with the cost optimization algorithms of the EFB systems 427. The connected aircraft stakeholders 435 (i.e. service providers) include the pilot 437, ATC 439, Airline Operations Control Center (AOCC) 441, ground staff 443, baggage handlers 445, Communication, navigation and surveillance (CNS)/air traffic management (ATM) 447, AOC 449, and external vendors 451. The IOT can establish communication of the aircraft data to the ground system. The cockpit avionics data exposes some of the cost data through approved channels like datalink, ADS-B/C, WiMAX, USB devices to an Electronic Bag configured operating cost app system. Then the operating cost app algorithms (i e software solutions) are executed and shared with the relevant stakeholders. In the case of individual airport servers, each can be integrated into a central server through secure cloud 429.

Figure 5:
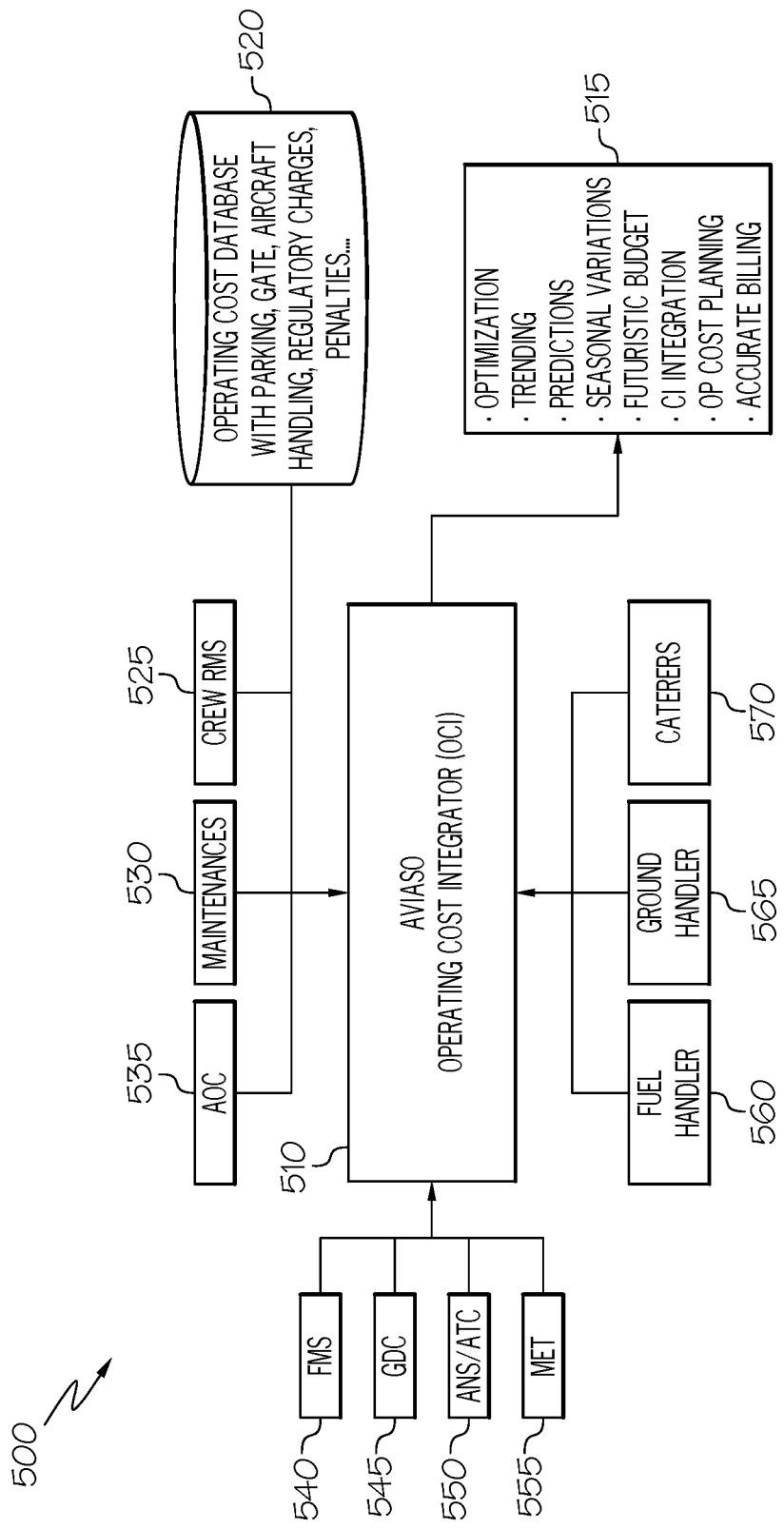
FIG. 5 illustrates an exemplary diagram of an operating cost integrator (OCI) module configured with the operating cost app, in accordance with an embodiment.

FIG. 5 illustrates an exemplary diagram of an operating cost integrator (OCI) module 510 configured with the operating cost app in accordance with an embodiment. The OCI module 510 of FIG. 5 serves as a central point to integrate multiple data types from various inputs and is configured with or integrated with the operating cost app (not shown) for enabling cost output analysis of costs data in the cockpit display using a graphic user interface (GUI). The GUI shows cost planning data that has been identified and deemed useful at various flight phases. In FIG. 5, the first step is to collect and create a database of all operating costs known as the operating cost database 520. The operating cost data of the operating cost database 520 includes costs per airport such as the parking costs, gate costs, regulatory charges, penalty charges at an airport and allows for more accurate cost estimations when calculating by the operating cost app the operating costs as the operating cost database 520 stores cost sets that vary from airport to airport. It is, therefore, essential to creating a server (not shown) at every airport for access to the operating cost database 520 by the OCI 510 to have access to the cost structure and data of each airport.

In various exemplary embodiments, the operating cost database 520 aside from the parking, gate, aircraft handling, regulatory charges, and penalties, can also include the local fuel cost structure and fuel cost. The OCI 510 application software is configured in a flexible data structure to receive input from a multitude of aviation systems including (but not limited to) the FMS 540, the global data center (GDC) 545, the ANS/ATC 550 and the Meteorological Information (MET) 555. In addition, the OCI software application receives data from the air operator certificate (AOC) 535, the maintenance modules 530, and the flight crew Remote Monitoring Subsystem (RMS) 525. With the AOC 535 data, the maintenance 530 data, and the crew RMS 525 data, operating cost data from a centralized database of operating costs 530 can also be accessed by the OCI 510 application software as depicted in FIG. 5 to provide the desired outputs. Also, cost data of the fuel, baggage operations and caterers are received from the fuel handler module 560, the ground handler module 565, and the caterer module 570.

The OCI of FIG. 5 will integrate all costs from different agencies and entities like the AOC, GDC, Airport authorities and Regulatory authorities. The OCI will use the operating cost database obtained from the centralized server via the networked cloud (which is continually updated) to retrieve actual operating sensor data, and to integrate the data so that the operating cost app can compute the actual costs, model cost models and archive the costs for trending, budgeting, and predictions.

In various exemplary embodiments, the HONEYWELL AVIASO® flight management software can gather data on aircraft usage and identify and communicate the ways airlines can save fuel consumption through an interface and the costs savings can be reported in the operating cost app. The OCI 510 can integrate aircraft usage data and provide analytics 515 such as trends, predictions, seasonal variations, future budgets, continuous integration (CI), operating plan (OP) cost planning, and accurate billing.

In various exemplary embodiments, the operating cost app with cost data retrieved by the OCI can determine the actual costs of the flight by using software solutions and based on sensor data from the aircraft can display in real-time aircraft performance parameters such as gate time, weight, arrival and departure times, etc. which affect the actual cost of the flight. Further, the operating cost app can independently calculate the ground charges at the airport derived from the sensed data. In addition, automated billing features can be implemented with the operating cost app that enable automated invoicing operations to send an invoice to an operator of the aircraft of the ground charge calculated by the operating cost app taking into account seasonal variations in costs at the airport. This can enable the operating cost app to identify a potential cost savings of a cost difference over the actual cost of the ground charge, and the cost provided by the service provider of the ground charge (ex. based on the actual landing and takeoff times).

Figure 6:
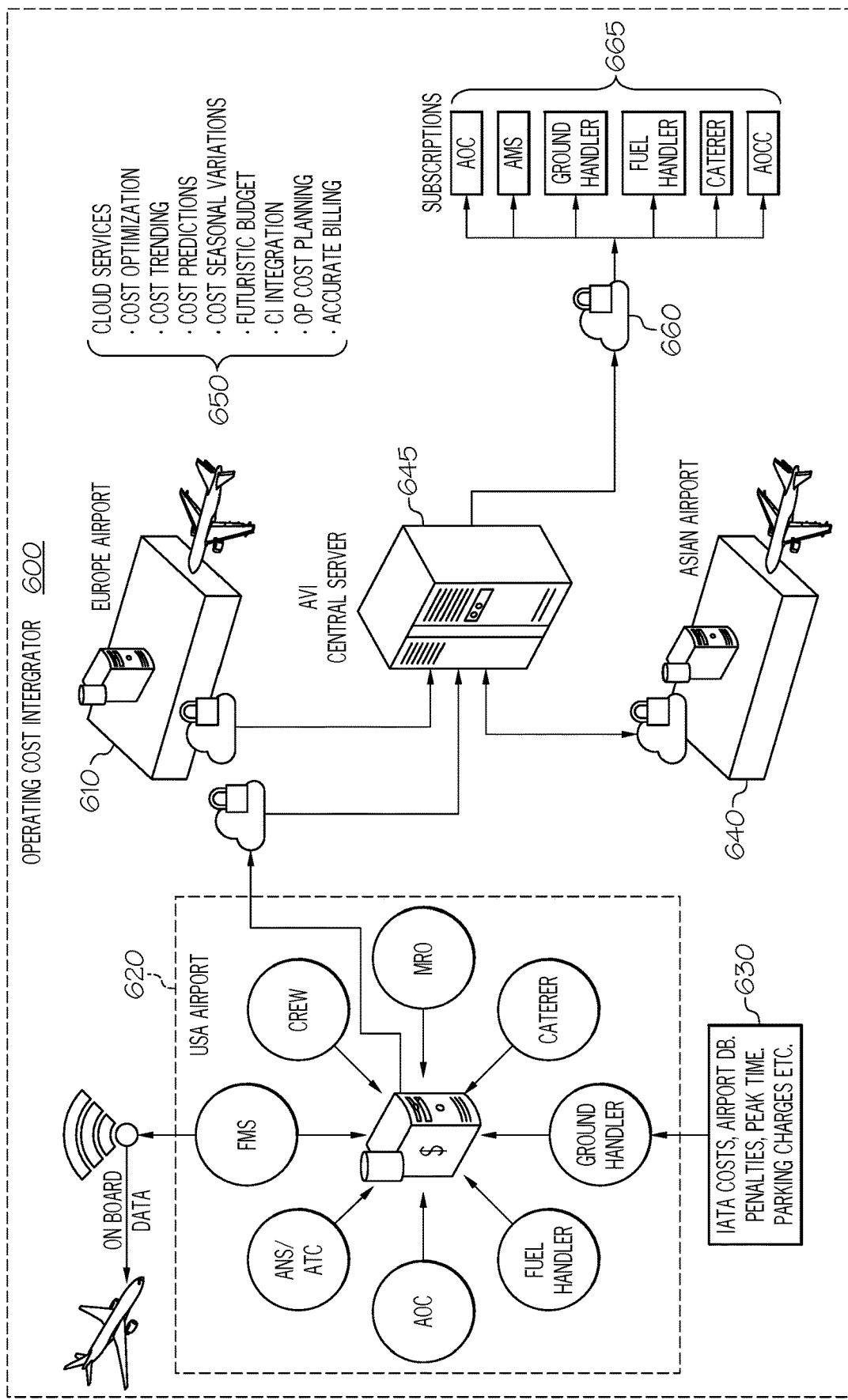
FIG. 6 illustrates a diagram of the operating cost integrator configured with multiple entities for receiving cost data, in accordance with an embodiment.

FIG. 6 illustrates a diagram of the operating cost integrator configured with multiple entities for receiving cost data in accordance with an embodiment. In FIG. 6, the operating cost integrator (OCI) 660 is configured to receive subscription services using data from data sources including air operator certificate (AOC), air navigation service (ANS), ground handling, fuel handling, catering, and AOCC sources of data. The subscription services 655 can be configured as SaaS services 650 and include: cost optimization, cost rending, cost prediction, cost seasonal variations, future budget services, continuous integration (CI), operating plan (Op) cost planning, and more accurate billing services. The OCI 660 can be hosted on a centralized server 645 with fuel efficiency and emission management software integrated to provide analytics to the user. The central server 645 can be configured with servers at remote destinations to retrieve and integrate dissimilar cost data (i.e. European airports 610 and Asian Airports 640) while maintaining secure server access. That is, it is feasible to implement the central server 645 with any other airport servers with the appropriate application program interface (API) configurations for sending and receiving data between different servers. Also, onboard data from the aircraft can be integrated from aircraft servers 620 and the data sources can include flight management systems (FMS), crew, maintenance repair overall (MRO), caterer, ground handler, air operator certificate (AOC), air navigation service (ANS)/ATC, fuel handler sources of data. In addition, from an International Air Transport Association (IATA) cost database 630, data about penalties, parking, peak time charges etc. can be sent to the aircraft server 620. In an exemplary embodiment, the HONEYWELL AVIASO® can interface with the operational cost integrator 600 using an application platform such as the HONEYWELL SENTINEL® application platform to provide the subscription services. The subscription services could be provided on either a per service basis or periodically (monthly/yearly) per service agreements with the carriers.

In FIG. 7, an exemplary graphical user interface (GUI) 700 is illustrated to show cost savings data of the operating cost app, in accordance with an embodiment. The GUI 700 includes a report 710 of value analytics based on assumptions per week per aircraft. The report 710 displayed in the GUI 700 includes data 710 reports based on predictions and reporting analytics of the numbers of halts and trips per week per aircraft, the parking time per aircraft, the loss cost because of parking time per trip, the totals of parking charges, the losses and costs saved, and the annual/percentage cost savings. For example in a fleet of 5 aircraft, an annual cost savings 720 is reported. The report 710 can be reconfigured as desired and is not limited to the particular depiction in FIG. 7. In addition, the analytics can be very quantified or expanded at higher levels to show different aspects of cost operations per trip, per aircraft, per week etc. In other words, there are a multitude of ways that the report 710 can be configured and the GUI 700 is configured in a manner to be responsive to user inputs and to provide various alternate configurations and analytics from solutions of the operating cost app (not shown) connected to various flight data sources.

Figure 8:
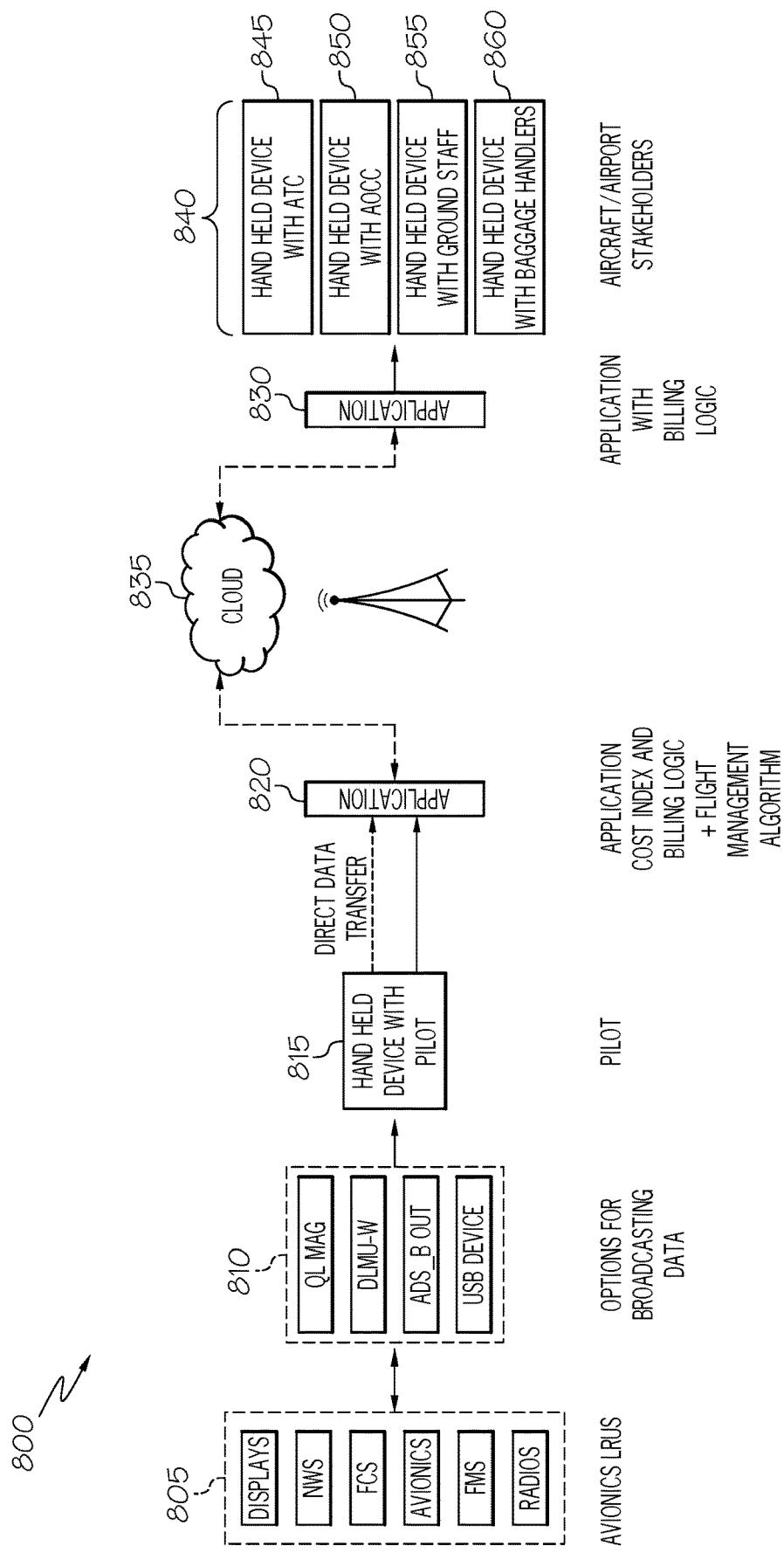
FIG. 8 is another embodiment of the pipeline processing of communicating data between various systems of the aircraft and ground personnel, and the operating cost app for analytical cost data processing in accordance with an embodiment.

FIG. 8 is another embodiment of the pipeline processing of communicating data between various systems of the aircraft and ground personnel, and the operating cost app for analytical cost data processing in accordance with an embodiment. In FIG. 8, there is illustrated data extraction from the cockpit through an operating cost app (i.e. an operating cost app interface) connecting the data to relevant stakeholders for several airport services like billing, SLA and KPI monitoring and for cost adherence. The data from the avionics LRUs 805 is broadcast, via any one of numerous data broadcasting system (e.g. ADS-B etc.) 810 to a handheld device 815 of the pilot. The handheld device 815 hosts an operating cost app 820 which can be configured with a cost index and billing logic as well as flight management software. The operating cost app 820 resides locally on the handheld device 815 and communicates via the cloud 825 using a common platform for sending and receiving data between a server-side operating cost app 830 that is hosted on a server. The server may reside in the cloud or at the destination. The server-side operating cost app 830 is connected to a set of mobile devices 840 that are operated by ground personnel and include handheld devices operated by the ATC 845, the AOCC 850, the ground staff 855, and the baggage handlers 860. The mobile devices 840 may be any computing device that includes at least one processor, some form of memory hardware, a user interface, and communication hardware and may be separate or integrated with the aircraft. For example, the computing device may be implemented using a personal computing device, such as a tablet computer, a laptop computer, a personal digital assistant (PDA), a smartphone, or the like. In other embodiments, for the pilot mobile device, the computing device may be implemented or integrated into a computer system onboard the aircraft.

The server-side operating cost app 830 is configured to give each of the ground personnel limited access to the cost data (i.e. billing data that is relevant to each ground personnel) and may send the request to each of ground personnel as needed. The cost data is accessible by the pilot by the pilot mobile device 815 and the operating cost app 820 that resides on the pilot mobile device 815 can display real-time cost data or predict future cost event data as needed or desired. In this manner, the pilot is able to play a key or collaborative role in assessing aircraft operations based on predicted operational costs thereby being given visibility in the cockpit of upcoming costs and having the opportunity to adjust aircraft operations in anticipation of the upcoming costs for cost optimization or reduction.

Figure 9:
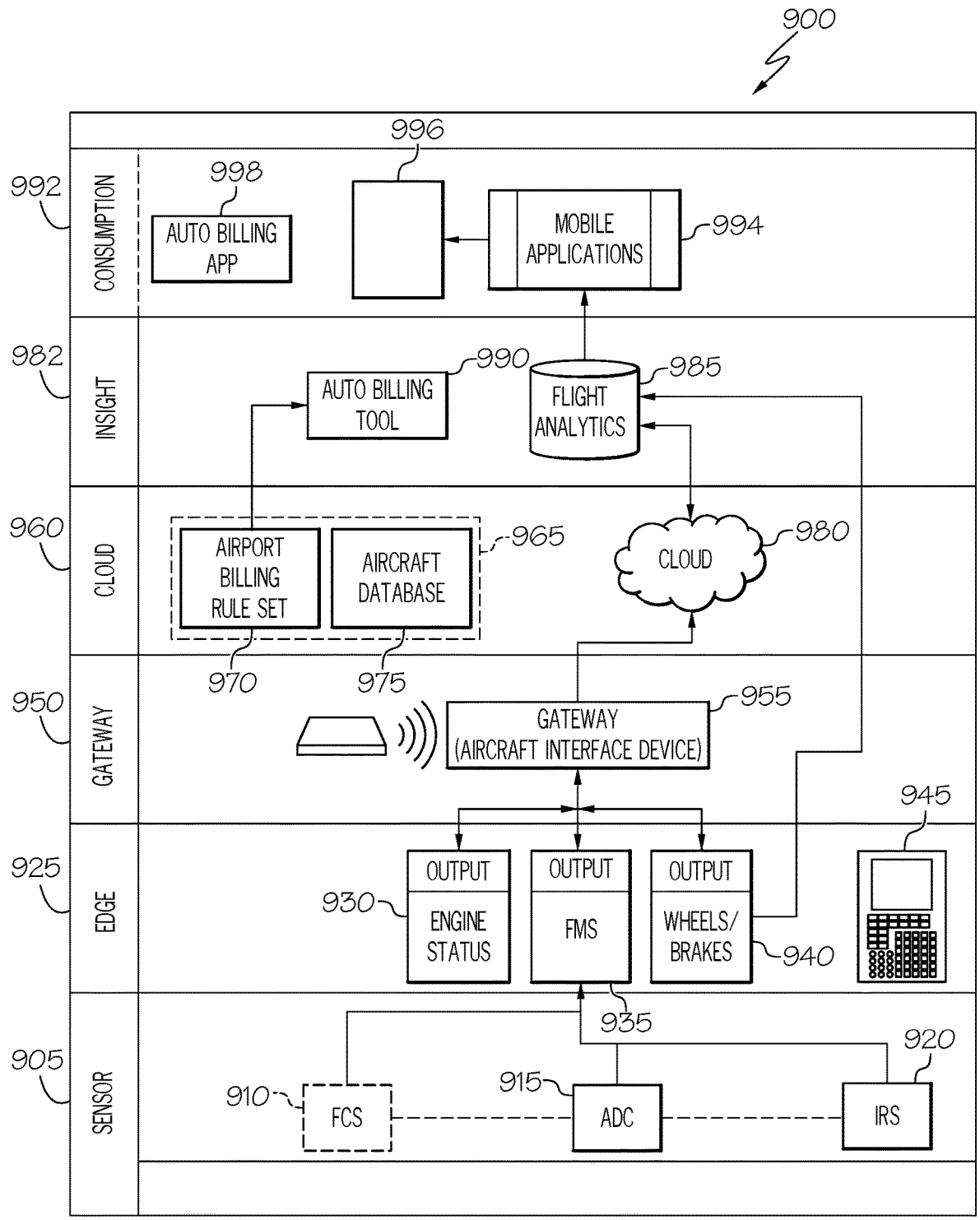
FIG. 9 is a flow diagram of the operating cost app integrated with flight management applications, in accordance with an embodiment.
Figure 10:
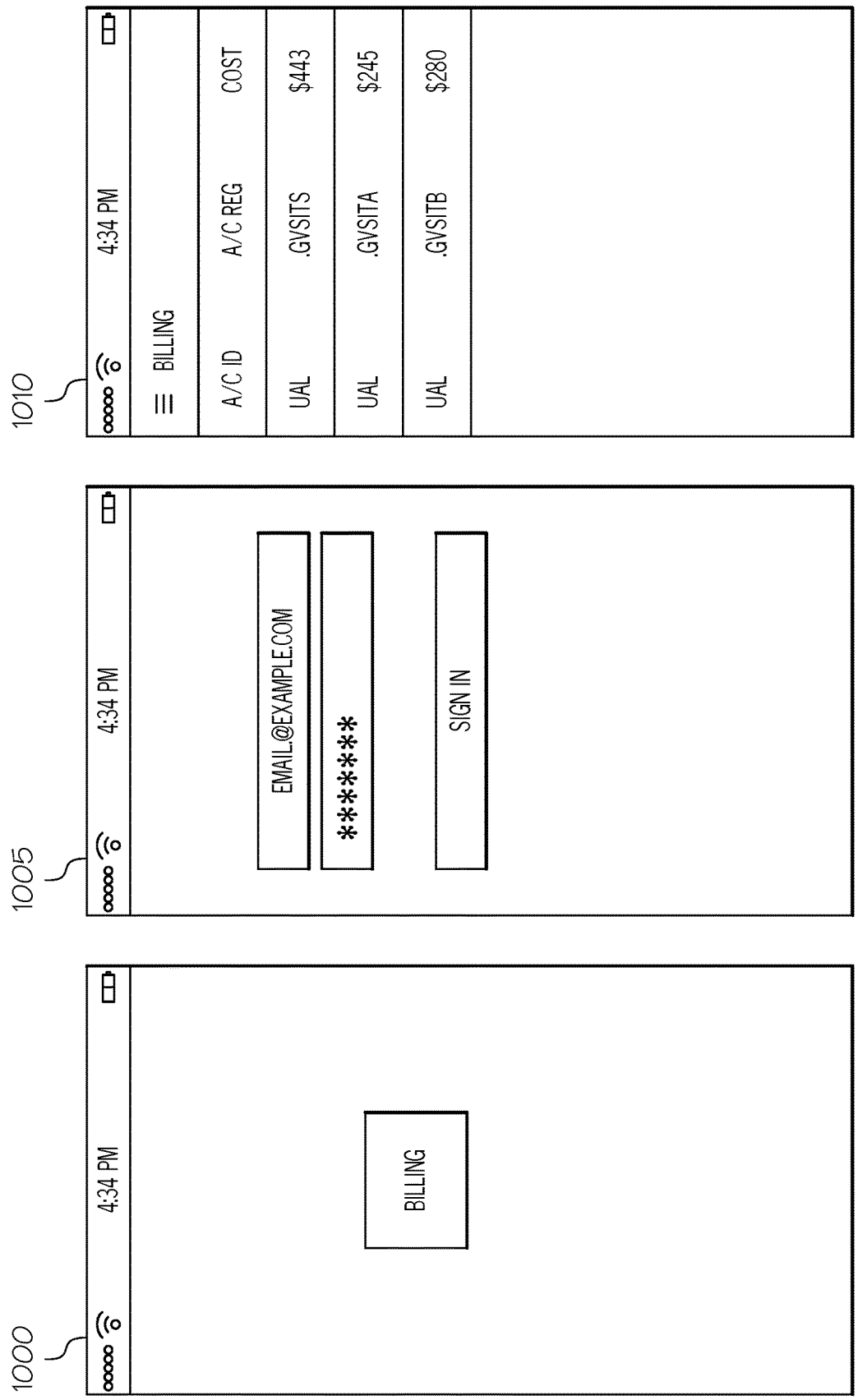
FIGS. 10A-E illustrate exemplary screenshots of the graphic user interface presented on the mobile device of the operating cost app, in accordance with an embodiment.

FIG. 9 is a flow diagram of the operating cost app integrated with flight management applications in accordance with an embodiment. The flight management process 900 includes a processing pipeline of data from the aircraft sensors 905, to edge processing modules 925, to cloud 960 connected services, via a gateway 950 where insight 982 billing tools process the data, and present for consumption 992 to the mobile users.

In an exemplary embodiment, The HONEYWELL GODIRECT™ Flight SENTINEL platform applies route management techniques by flight control specialists proactively to reduce delays by route changes to avoid traffic congestion and weather conditions. In addition, the flight management process 900 can enable the application of collaborative decision making (CDM) to ensure an on-time departure.

In FIG. 9, data from the sensors 905 includes data from the flight control system (FCS) 910, the aircraft data computer (ADC 915, the inertial reference system (IRS) 920 . . . . etc. These data are sent to edge processing modules 925 of the engine status 930, FMS 935 operations, wheels, and braking 940 operations to display in a cockpit display 945. Next, the outputs from the edge 925 processing modules send data via the gateway 950 (i.e. aircraft interface device 955) to the cloud 960. The cloud 960 can be configured with any one of numerous application 980 cloud solutions to enable operating cost applications 965 of an airport billing rules set 970 in conjunction with an aircraft database 975. From the application of this rule set, automated billing tools 990 can be configured related to flight analytics 985 for insight into flight costs and prediction of future flight costs based on the flight analytics 985 and for automated billing of costs of the flight operations. The results from the flight analytics 985 and automated billing costs from the automated billing tools 990 can be sent to the mobile operating cost app 994 for presentation and viewing in an operating cost app graphic user interface 996 to the pilot. The operating cost app GUI 996 may be configured in a manner for the pilot to view itemized billing actions performed (via the automated operating cost app 998). Further, input tools may be configured with the automated operating cost app 998 that require pilot approval or can enable highlighting or marking of costs that the pilot is unsure, or are questionable, or require more information, or are out of the norm etc. for further review in order to optimize and manage costs expended.

FIGS. 10A-E illustrates exemplary screenshots of the graphic user interface presented on the mobile device of the operating cost app in accordance with an embodiment. The operating cost app 1000 (of FIG. 10A) can be displayed on a mobile device connected to the aircraft or integrated into cockpit displays with aviation systems of the aircraft and is configured to communicate via a secure access cloud to retrieve flight data. In various exemplary embodiments, the flight data may be processed by HONEYWELL AVIASO® algorithms and data transfer can be approved from EFB systems with cost optimization algorithms for collecting and analyzing flight data.

The operating cost app can be configured on a variety of operating system platforms including ANDROID®, APPLE IOS®, or other distributed computing operating system platforms. Further, the operating cost app can be configured to receive updates, on-demand snap in-app modules etc. The operating cost app 1000 is configured to simulate the automated billing for each flight. The billing algorithm can reside locally and be configured with the operating cost app 1000. Data is retrieved such as the aircraft ID, aircraft type, registration, origin, destination, landing weight, take-off time, touch downtime, and the derived outputs from the operating cost app 1000 can include the parking time, landing cost, navigation aids costs, ATC service costs, penalties etc. The operating cost app 1000 is configured with a graphic user interface of secure log-in 1005 (of FIG. 10B) that enables costs data sharing based on the access granted for each user by the system administrator. The GUI is configured for a display of the billing (i.e. cost expense for each aircraft in the fleet) related to each flight 1010 (of FIG. 10C) identified where the user selects the flight for more detailed display of costs invoiced in detailed costs 1030 (of FIG. 10E) displayed. In addition, the operating cost app 1000 can display the aircraft current attributes 1020 (of FIG. 10D) so the pilot can check that the charges based on the aircraft attributes (i.e. weight, parking, ATC charges etc.) are correct. The detailed costs 1030 (of FIG. 10E) can be displayed in various charts (i.e. pie chart 1035) for convenient viewing and comparison of the different cost attributes.

Figure 11:
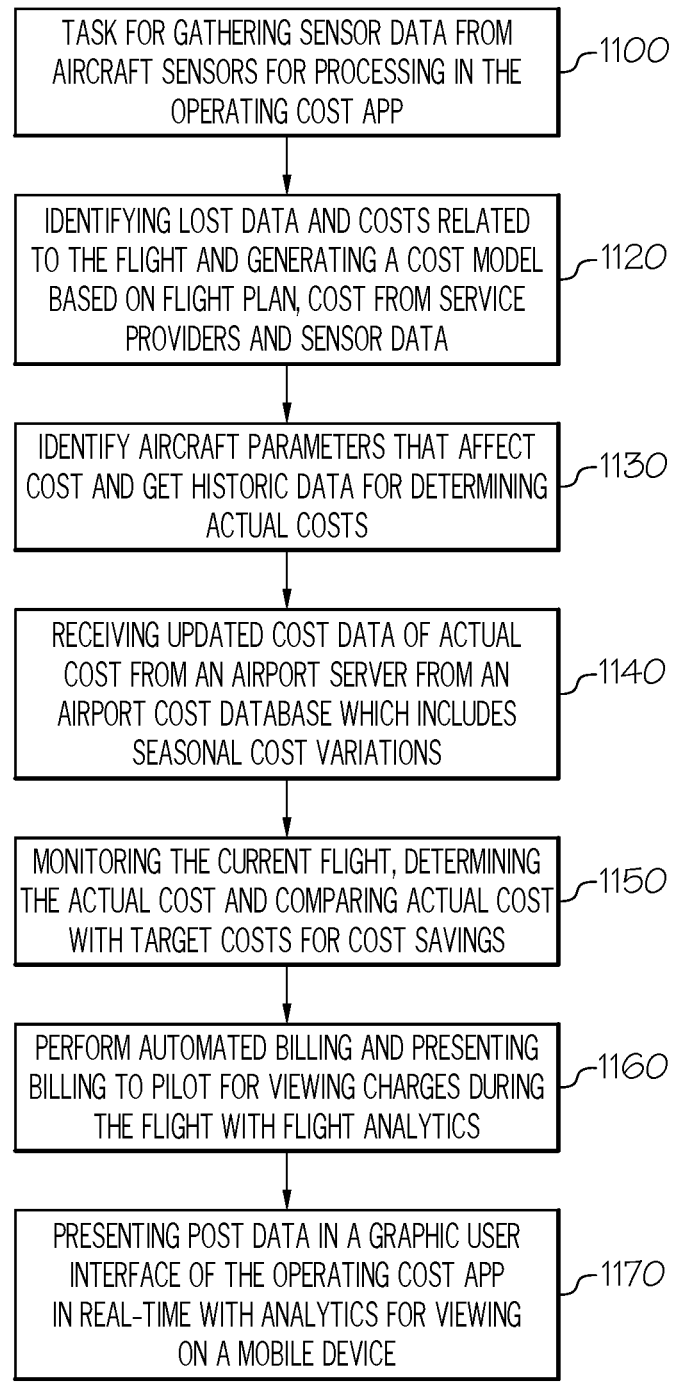
FIG. 11 is a flowchart depicting steps in the operating cost app for analyzing and presenting the cost data, in accordance with an embodiment.

FIG. 11 is a flowchart depicting steps in the operating cost app for analyzing and presenting the cost data in accordance with an embodiment. In FIG. 11, at task 1100, sensor data is acquired from aircraft flight sensors is gathered for processing with flight management software for displaying along with the flight plan on a mobile device in the cockpit and for use in the operating cost app. At task 1120, cost data related to the flight plan is obtained with an operating cost integrator to interface with a plurality of service providers for retrieving direct and indirect operating cost data of the flight plan and for also creating a target cost model. In addition, the cost data in this target cost model can include a predetermined cost index for the flight plan under anticipated conditions. At task 1130, cost data related to real-time aircraft performance parameters affecting the actual cost of the flight is obtained and used in the real-time aircraft performance parameters. In addition, historic cost performance data can also be used in this cost model generated. At task 1140, cost data from the operating cost data located at a server at the airport is obtained and can include parking costs, gate costs, aircraft handling costs, penalty costs etc. At task 1150, cost data is monitored continuously during the flight and sent to the operating cost app from the service providers to determine the actual cost of the flight by using software solutions of the operating cost app, the sensor data, and the real-time aircraft performance parameters which affect the actual cost. For example, charges such as the ground charges are calculated from the sensed data and the server cost data at the airport by the operating cost app in real-time using the performance parameters received (ex. the an actual landing time and an actual takeoff time etc.) At task 1160, automated billing is performed by the operating cost app using airport billing rules, and an auto-billing tool of the operating cost app to send charges at times or actions that correspond with flight analytics. At task 1170, the cost data is presented in a GUI of the cost operating app on a mobile device or aircraft display accessible in the cockpit so the pilot has real-time awareness of costs incurred and the cost data for the flight. The cost data can be presented in a multitude of display configurations in the GUI of the cost operating app and can be itemized or displayed using various graphs (i.e. pie graphs, bar graphs etc.). The pilot can choose as an option to validate the costs billed so that there are no errors in costs billed.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected"

means that one element/node/feature is directly joined to (or directly communicates with) another element/node/feature, and not necessarily mechanically. Thus, although the schematic is shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing cost data via an operating cost app for a flight associated with a flight plan, by a computing device onboard an aircraft, the computing device including at least one processor coupled with a system memory element for storing instructions to implement the operating cost app, the method comprising:
   obtaining cost data of the flight plan, by the at least one processor, by executing the operating cost app to implement an operating cost integrator application integrated with the operating cost app to interface with a plurality of service providers for retrieving direct and indirect operating cost data of the flight plan from each of the service providers wherein the cost data includes a predetermined cost index for the flight plan under anticipated conditions;
   obtaining, by the at least one processor, real-time aircraft performance parameters affecting the actual cost of the flight for configuring the operating cost app wherein the real-time aircraft performance parameters at least comprise: a landing time and a takeoff time at an airport by the aircraft;
   monitoring continuously, by the at least one processor, during the flight, a plurality of costs sent to the operating cost app from the plurality of service providers to determine the actual cost of the flight;
   determining, by the at least one processor, an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters comprise: an actual landing time and an actual takeoff time;
   automatically billing, by the at least one processor by automated invoicing operations of the operating cost app, to send an invoice to an operator of the aircraft of the ground charge calculated by the operating cost app taking into account seasonal variations in costs at the airport wherein the operating cost app attempts to identify a potential cost savings of a cost difference over the actual cost of the ground charge, and the cost provided by the service provider of the ground charge based on an actual landing and takeoff times; and
   presenting the actual cost of the ground charge, via a display device communicatively coupled to the at least one processor for displaying and validating in real-time the ground charge by flight personnel during the flight.

2. The method of claim 1, further comprising:
   obtaining cost data related to the flight plan, by the operating cost app, by configuring the operating cost integrator application to receive cost data from an operating cost database located at a server at each airport on the flight plan.

3. The method of claim 2, further comprising:
   obtaining historic cost performance data for the flight plan and a predetermined cost index of the flight plan under anticipated conditions, by the at least one processor;
   obtaining the real-time aircraft performance parameters affecting the actual cost of the flight, using continuous monitoring during the flight; and
   creating a real-time model based on the historic cost performance data, the predetermined cost index, and the real-time aircraft performance parameters for predicting cost data.

4. The method of claim 3, wherein the operating cost database includes cost data comprising: parking costs, gate costs, aircraft handling costs, and penalty costs.

5. The method of claim 4, wherein the operating cost integrator application integrates cost data from a plurality of entities at least comprising: airport authorities, regulatory agencies, and route navigation facilities.

6. The method of claim 5, further comprising:
calculating, by the at least one processor, the cost data for route navigation costs corresponding to the flight plan and aviation systems of the aircraft using the operating cost app to determine a cost savings of a cost difference between a cost target based on the flight plan costs and the actual cost wherein the cost savings comprises at least the cost difference between the cost target and the actual cost.

7. A computing device onboard an aircraft, the computing device for providing cost data for a flight associated with a flight plan, the computing device comprising:
a system memory element;
a display device, configured to present graphical elements and text associated with the cost data for the flight associated with the flight plan; and
at least one processor communicatively coupled to the system memory element and the display device, the at least one processor configured to:
obtain cost data of the flight plan by executing the operating cost app to implement an operating cost integrator application integrated with the operating cost app to interface with a plurality of service providers for retrieving direct and indirect operating cost data of the flight plan from each of the service providers wherein the cost data includes a predetermined cost index for the flight plan under anticipated conditions;
obtain real-time aircraft performance parameters affecting the actual cost of the flight for configuring the operating cost app wherein the real-time aircraft performance parameters at least comprise: a landing time and a takeoff time at an airport by the aircraft;
monitor during the flight, a plurality of costs sent to the operating cost app from the plurality of service providers to determine the actual cost of the flight;
determine an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters comprise: an actual landing time and an actual takeoff time;
invoice, by automated billing operations of the operating cost app, costs to an operator of the aircraft of the ground charges calculated by the operating cost app taking into account seasonal variations in costs of the airport wherein the operating cost app attempts to identify a potential cost savings of a cost difference over the actual cost of the ground charge, and the cost provided by the service provider of the ground charge based on the actual landing and takeoff times; and
present the flight plan costs, via the operating cost app on the display device.

8. The computing device of claim 7, wherein the at least one processor is further configured to:
obtain cost data related to the flight plan, by the operating cost app, by configuring the operating cost integrator application to receive cost data from an operating cost database located at a server at each airport on the flight plan.

9. The computing device of claim 8, wherein the computing device further comprises:

a user interface configured to receive user input selections to the computing device, wherein the user interface is communicatively coupled to the at least one processor;
wherein the at least one processor is further configured to present itemized cost data responsive to user input selections of the operating cost app.

10. The computing device of claim 9, wherein the at least one processor is further configured to:
obtain historic cost performance data for the flight plan and a predetermined cost index of the flight plan under anticipated conditions, by the at least one processor;
obtain the real-time aircraft performance parameters affecting the actual cost of the flight, using continuous monitoring during the flight; and
create a real-time model based on the historic cost performance data, the predetermined cost index, and the real-time aircraft performance parameters for use to predict cost data.

11. The computing device of claim 10, wherein the operating cost database includes cost data comprising: parking costs, gate costs, aircraft handling costs, and penalty costs.

12. The computing device of claim 11, wherein the operating cost integrator application integrates cost data from a plurality of entities at least comprising: airport authorities, regulatory agencies, and route navigation facilities.

13. The computing device of claim 12, wherein the at least one processor is further configured to:
calculate the cost data for route navigation costs corresponding to the flight plan and aviation systems of the aircraft using the operating cost app to determine a cost savings of a cost difference between a cost target based on flight plan costs and the actual cost wherein the cost savings comprises at least the cost difference between the cost target and the actual cost.

14. A non-transitory, computer-readable medium containing instructions thereon, which, when executed by a processor, perform a method for providing cost data for a flight associated with a flight plan, by a computing device onboard an aircraft, the computing device comprising the processor and a system memory element, the method comprising:
obtaining cost data of the flight plan, by the processor, executing the operating cost app to implement an operating cost integrator application integrated with the operating cost app to interface with a plurality of service providers for retrieving direct and indirect operating cost data of the flight plan from each of the service providers wherein the cost data includes a predetermined cost index for the flight plan under anticipated conditions;
obtaining, by the processor, real-time aircraft performance parameters affecting the actual cost of the flight for configuring the operating cost app wherein the real-time aircraft performance parameters at least comprise: a landing time and a takeoff time at an airport by the aircraft;
monitoring continuously, by the processor, during the flight, a plurality of costs sent to the operating cost app from the plurality of service providers to determine the actual cost of the flight;
determining, by the processor, an actual cost of the flight by using software solutions of the operating cost app, based on sensed data from the aircraft related to the real-time aircraft performance parameters which affect the actual cost, and by calculating ground charges at the airport derived from the sensed data by the operating cost app wherein the real-time performance parameters comprise: an actual landing time and an actual takeoff time;

automatically billing, by the processor by executing automated billing operations performed by the operating cost app, to send an invoice to an operator of the aircraft of the ground charge calculated by the operating cost app taking into account seasonal variations in costs at the airport wherein the operating cost app attempts to identify a potential cost savings of a cost difference over the actual cost of the ground charge, and the cost provided by the service provider of the ground charge based on the actual landing and takeoff times; and presenting the actual cost of the ground charge, via a display device communicatively coupled to the at least one processor for displaying and validating in real-time the ground charge during the flight.

15. The non-transitory, computer-readable medium of claim 14, further comprising:

obtaining cost data related to the flight plan, by the operating cost app, by configuring the operating cost integrator application to receive cost data from an operating cost database located at a server at each airport on the flight plan.

16. The non-transitory, computer-readable medium of claim 15, further comprising:

obtaining historic cost performance data for the flight plan and a predetermined cost index of the flight plan under anticipated conditions, by the at least one processor;

obtaining the real-time aircraft performance parameters affecting the actual cost of the flight, using continuous monitoring during the flight; and creating a real-time model based on the historic cost performance data, the predetermined cost index, and the real-time aircraft performance parameters for use in predicting cost data trends.

17. The non-transitory, computer-readable medium of claim 16, wherein the operating cost database includes cost data comprising: parking costs, gate costs, aircraft handling costs, and penalty costs.

18. The non-transitory, computer-readable medium of claim 17, wherein the operating cost integrator application integrates cost data from a plurality of entities at least comprising: airport authorities, regulatory agencies, and route navigation facilities.

19. The non-transitory, computer-readable medium of claim 18, further comprising:

calculating, by the at least one processor, the cost data for route navigation costs corresponding to the flight plan and aviation systems of the aircraft using the operating cost app to determine a cost savings of a cost difference between a cost target based on flight plan cost and the actual cost wherein the cost savings comprises at least the cost difference between the cost target and the actual cost.

20. The non-transitory, computer-readable medium of claim 19, wherein creating the real-time model further comprises:

obtaining historic cost performance data for the flight plan and a predetermined cost index of the flight plan under anticipated conditions, by the processor;

obtaining the real-time aircraft performance parameters affecting the actual cost of the flight, using continuous monitoring during the flight, wherein the real-time aircraft performance parameters include at least aircraft ground operation times and aircraft weight;

creating the real-time model based on the historic cost performance data, the predetermined cost index, and the real-time aircraft performance parameters of ground time operation times and aircraft weight; and forecasting trends of the actual cost from the cost target based on the flight plan using the real-time model to identify cost savings from changes in the flight plan as the flight progresses, by the processor.

* * * * *